United States Patent [19]

Bryan et al.

[11] 4,000,952

[45] Jan. 4, 1977

[54] WELD JOINT HAVING A WELD DROPPINGS RECEIVING POCKET

[75] Inventors: Harold Bryan; James W. Johnson, both of Houston, Tex.

[73] Assignee: ACF Industries, Incorporated, New York, N.Y.

[22] Filed: Aug. 29, 1975

[21] Appl. No.: 608,851

[52] U.S. Cl. .................................. 403/271; 52/415; 251/315

[51] Int. Cl.[2] .......................................... B25G 3/34

[58] Field of Search .......... 403/265, 266, 267, 268, 403/269, 270, 271, 272; 52/758 B; 251/315

[56] References Cited

UNITED STATES PATENTS

| 1,961,117 | 5/1934 | Wall | 403/272 X |
|---|---|---|---|
| 3,458,224 | 7/1969 | Freese | 52/758 B |
| 3,916,940 | 11/1975 | Allen | 251/315 X |

FOREIGN PATENTS OR APPLICATIONS

| 580,853 | 7/1933 | Germany | 403/272 |

*Primary Examiner*—Wayne L. Shedd
*Attorney, Agent, or Firm*—Eugene N. Riddle

[57] ABSTRACT

A full penetration weld joint for connecting adjacent end portions of two members wherein one end portion has an inner lip extending therefrom and the other end portion fits over and laps the lip. Opposed end surfaces of the members are inclined outwardly in divergent relation from the lip and the end surfaces are spaced slightly forming a gap therebetween. In the end portion having the lip a generally U-shaped groove extends inwardly within the lip and substantially beneath the adjacent inclined end surface. The U-shaped groove is angularly oriented relative to the longitudinal axis of the lip and is positioned adjacent the gap which is formed between closely spaced flat portions on the end surfaces.

9 Claims, 8 Drawing Figures

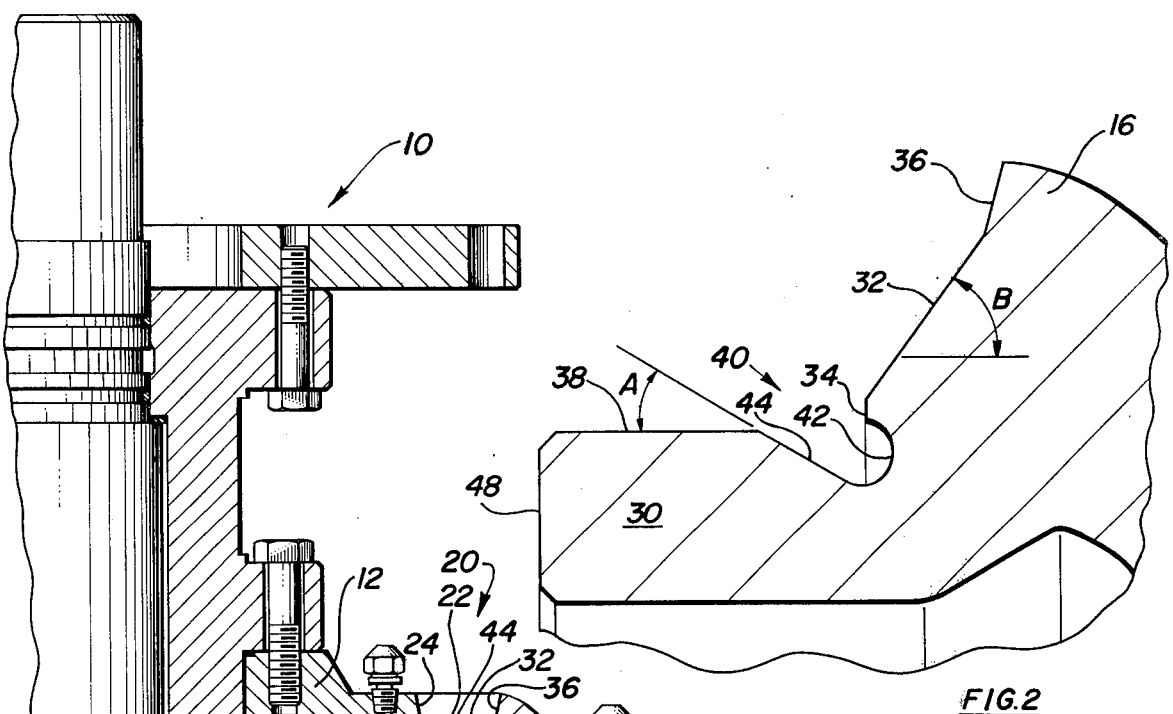
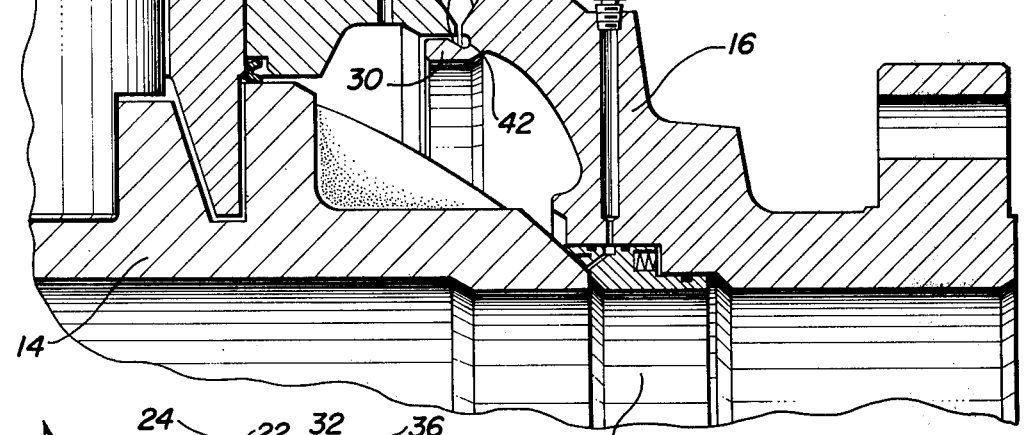
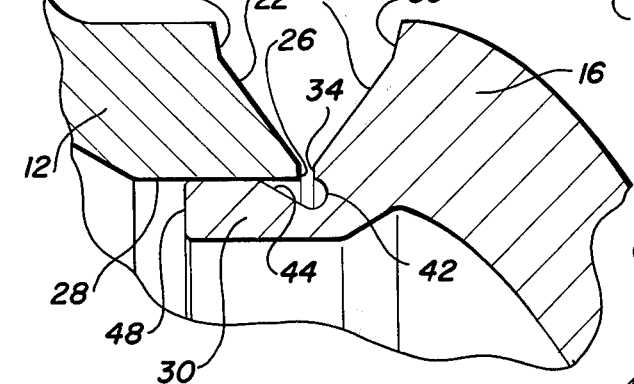
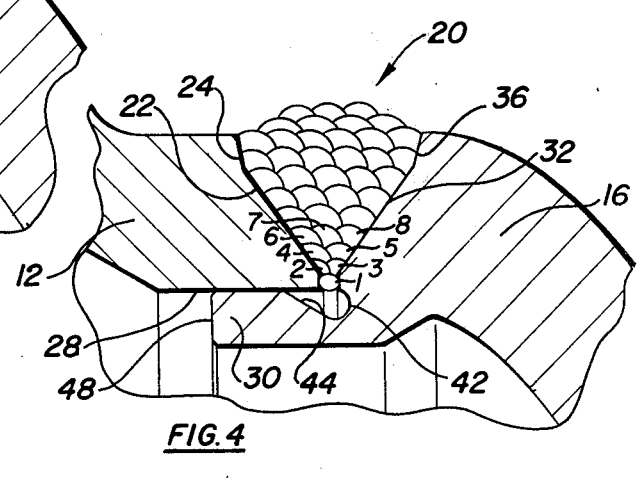

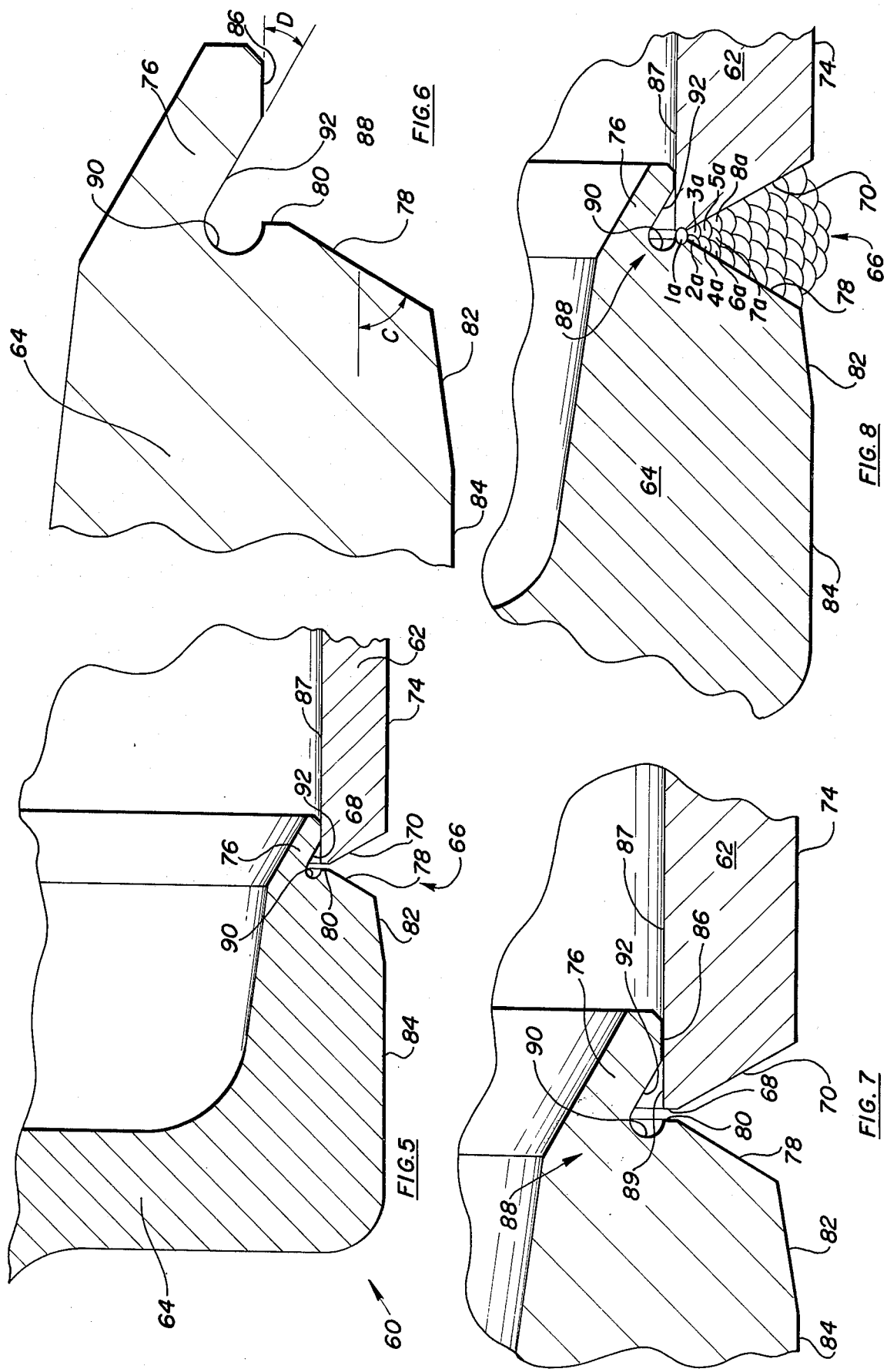

WELD JOINT HAVING A WELD DROPPINGS RECEIVING POCKET

BACKGROUND OF THE INVENTION

This invention is related to weld joints which are constructed with a pocket to receive droppings or slag from opposed ends of the materials being welded. More particularly, the invention is related to a full penetration weld joint wherein one of the members to be welded is provided with a lip on one side thereof which laps the adjacent edge portion of the other member. In this joint a pocket in the form of a groove is formed in the first member at the juncture of the edge to be welded and the lip for catching weld droppings, slag and other material when the joint is welded.

Numerous kinds of butt weld joints are known in the prior art for joining two members together. Some of these weld joints are provided with a lip on one member to rest against the other member for purposes of alignment and strength. In the art it is known to form a pocket in this type of joint at the juncture of the lip and the edge which is to be welded. However, in the art the pockets known heretofore are difficult to form due to complicated machining necessary to achieve a suitable pocketed shape. The known pockets are generally cross-sectionally rectangular and in some cases have an arcuate portion in the portion below or underneath the surface to be welded. Forming a pocket of this type requires at least one pass of a cutting machine to notch the lip adjacent to the end surface to be welded and at least one additional pass of the machine to form the portion of the notch which is underneath or undercuts the surface to be welded. Basically, it is not desirable to form pockets in this manner because of the expense and time involved in setting up a machine to make the several cuts, and the skill and technique required by an operator to make the cuts while at the same time maintaining tolerances within acceptable limits.

SUMMARY OF THE INVENTION

The weld joint of this invention includes one member having a lip on one side thereof to lap the abutting end portion of another member. The members end portions which are to be joined by welding have opposed flat end portions in the root of the joint and outwardly inclined surfaces which are divergent from the root of the joint. A groove is formed in the first member at the juncture of the lip and the flat portion with the closed end thereof positioned underneath the inclined surface. The groove is generally U-shaped in cross section and it is inclined at an angle of between 20°–55° relative to the portion of the lip which laps over the second member. The U-shaped groove opens at the juncture of the lip and the flat end portion on the first member. The joint is positioned for welding with the members spaced apart by a gap of from between one sixteenth inch (1.508 mm) and three eighths inch (9.54 mm) between their flat end portions.

One object of this invention is to provide a full penetration well joint structure which has a pocket for receiving well droppings, slag, etc. and which overcomes the aforementioned disadvantages of the prior art weld joints.

Still, one other object of this invention is to provide a full penetration weld joint structure for butt welding two members wherein a pocket in the form of a groove is formed in one of the members to receive weld joint droppings, slag, etc.

Still, another object of this invention is to provide a weld joint structure for joining the body and the tailpiece of a ball valve or for joining a hollow cylindrical member and an end cap structure wherein for each case one of the members has a lip on an inner portion thereof which laps over an inner portion of the other member with a pocket formed in the first joint member at the juncture of the surface to be welded and the lip so that as the joint is welded, weld droppings, slag and etc. drop into the pocket.

Various other objects, advantages and features of this invention will become apparent to those skilled in the art from the following discussion taken in conjunction with the accompanying drawings.

DESCRIPTION OF THE DRAWINGS

FIG. 1 is a fragmentary view of a portion of a ball valve employing the weld joint forming one embodiment of this invention to join the valve body and the tailpiece with the members forming the weld joint shown in their positioned relation before welding;

FIG. 2 is an enlarged cross-sectional view of a segment of the ball valve tailpiece showing the lipped portion of the weld joint;

FIG. 3 is a cross-sectional view of the weld joint portion of the ball valve body and tailpiece showing the end members in the position they assume prior to being welded;

FIG. 4 is a cross-sectional view of the weld joint portion of the ball valve body and tailpiece in the welded position with curved lines illustrating weld beads in the joint and numerals on the root portion weld beads indicating an order of applying the weld beads;

FIG. 5 is a fragmentary view of a portion of a hydraulic cushioning unit cylinder comprising another embodiment of this invention showing a portion of a cylinder and a portion of an end cap joined by the weld joint of this invention;

FIG. 6 is an enlarged cross-sectional view of a segment of the end cap showing the lipped portion of the weld joint;

FIG. 7 is a cross-sectional view of a segment of the end cap and cylinder showing the weld joint in position prior to welding; and FIG. 8 is a cross-sectional view of a segment of the end cap and cylinder showing the weld joint in a welded condition with curved lines illustrating weld beads in the joint and numerals on the root portion weld beads indicating an order of applying same.

The following is a discussion and description of preferred specific embodiments of the weld joint structure of this invention, such being made with reference to the drawings, whereupon the same reference numerals are used to indicate the same or similar parts and/or structure. It is to be understood that such discussion and description is not to unduly limit the scope of the invention.

DETAILED DESCRIPTION

Referring to the drawings and more particularly to the embodiment 1 shown in FIGS. 1–4, FIG. 1 shows a cutaway view of a fabricated ball valve, indicated generally at 10. The ball valve includes a valve body 12 which receives and encloses a ball 14. Valve body 12 has a tailpiece 16 which is mounted on one end of the valve body. Ball valve 10 is constructed with ball 14 being inserted into valve body 12 after one seat is placed in it, then tailpiece 16 having the other seat 18 is mounted on valve body 12. Valve body 12 and tailpiece 16 are joined by welding sidewalls of the two members. One application for the weld joint of this invention is in securing or joining valve body 12 to valve body 16. The weld joint of this invention in this valve welding application is indicated generally at 20.

Weld joint 20 is shown in detail in FIGS. 1 and 3 in its assembled position with the facing end portions of valve body 12 and tailpiece 16 positioned substantially as they will be when welded. Half of weld joint 20 is formed on the end edge portion of the valve body sidewall and includes an inclined surface portion 22 covering the major portion of the sidewall thickness, a second inclined portion 24 on the outer portion of the thickness and a flat end surface 26 on the inner end of the sidewall. Flat end surface 26 is located at what is the root portion of weld joint 20. Valve body 12 is hollow and it has a cylindrical surface 28 on its interior at the end edge portion. Flat end surface 26 intersects cylindrical surface 28 and is essentially perpendicular or radially disposed relative to cylindrical surface 28. Second inclined portion 24 is preferably inclined more nearly perpendicular relative to cylindrical surface 28 than inclined surface 22. Second inclined portion 24 is used to reduce the amount of filler material necessary to fill the gap of the weld joints.

The other portion of weld joint 20 is formed on the end portion of the sidewall of tailpiece 16 and includes a lip 30 extending outwardly from an inner portion so it can be positioned in overlapping relation on the interior end portion of valve body 12. FIG. 2 shows this portion of weld joint 20 in enlarged view. The portion of weld joint 20 on tailpiece 16 has an incline surface 32 extending at an incline upward and radially outwardly from a flat surface 34 at the root portion of the joint. Another or second inclined surface 36 joins inclined surface 32 at the outer portion of the tailpiece sidewall. Lip 30 is integrally formed with the outer portion of tailpiece 16. Lip 30 has a generally cylindrically shaped outer surface 38 which when installed rests on cylindrical surface 28 on valve body 12. Cylindrical surface 38 is essentially cylindrical about the flow line axis of the valve. An essentially U-shaped groove, indicated generally at 40, is formed in tailpiece 16 at the juncture of lip 30 and the lower end of flat 34. U-shaped groove 40 has its closed portion 42 undercutting or essentially underneath inclined surface 32. U-shaped groove 40 is angularly inclined relative to surface 38 and flat end surface 34. One side of groove 40 is indicated at 44 and it is longer than the other side. Groove side 44 intersects cylindrical surface 38 at a point on lip 30 substantially spaced from flat end surface 34. The end 48 of lip 30 is blunt and has the edges thereof champhered as shown.

U-shaped groove 40 is preferably constructed with its sides oriented at an angle of from around 20° to around 55° with respect to surface 38. The angle of inclination of the grooves longer side is indicated at angle A in FIG. 2. In practice, it has been found desirable for certain ball valve constructions to have U-shaped groove 40 formed with side 44 being at an angle of around 30° relative to surface 38. Groove 40 can vary in width from between one sixty-fourth inch, (3.97 mm) and 1 inch, (2.54 cm) or larger, depending upon the thicknesses and sizes of materials being welded. In practice for material of about 1⅜ inch (3.49 cm), a groove width of about three sixteenths inch (0.476 cm) has been found to be desirable. Preferably the grooves closed end portion 42 is arcuate or shaped in a cross-sectionally rounded configuration as shown in detail in FIG. 2. Groove closed end portion 42 can be a shape other than round however it must be understood that its shape must be smoothly contoured to avoid unduly large stress concentrations. Inclined surfaces 22 and 32 are preferably inclined at substantially about the same angle relative to the flow line axis of valve 10. The flow line axis extends through valve 10 and for purposes at hand contains the centroid of the arc of curvature of body 12 and tailpiece 16 at weld joint 20. FIG. 2 shows the inclination of surface 32 at angle B. Angle B can vary in the range of from about 30° to about 80°. Preferably, Angle B is about 37½° because this is a well-accepted industry standard for full penetration weld joints. Surfaces 24 and 36 can be inclined at an angle of between 5° to 30° relative to a plane perpendicular to the valve flow line axis. In practice, inclined surfaces will vary in their degree of inclination depending upon the thickness of the members being welded. For example, when welding a material having a thickness of between about 1 inch (2.54 cm) and 2 inch (5.08 cm) surfaces 24 and 36 can be inclined about 10°. In practice, in constructing U-shaped groove 40 it has been successfully used on large ball valves and formed after surfaces 36, 32, 34 and 38 are machined on the tailpiece. Once these surfaces have been machined on tailpiece 16, then one additional cut is made with a machine cutting tool to form U-shaped groove 40.

FIG. 3 shows weld joint 20 in the assembled and unwelded condition. In this unwelded condition, surfaces 28 and 38 are in contact and flat surfaces 26 and 34 are spaced apart by a gap. U-shaped groove side 44 is positioned under cylindrical surface 28 with the juncture of surfaces 38 and 44 being at a point on surface 28 substantially spaced from flat end surface 26. When the ball valve 10 is assembled in this position it is supported such that valve body 12 and tailpiece 16 are in a fixed position relative to each other for welding. In practice in welding large ball valves, it has been found convenient to place the valve body on the floor with the tailpiece on top and insert a plurality of spacers between end surfaces 26 and 34 to size the gap. The actual welding of joint 20 begins with a root pass (sometimes called a hot pass) and is made first to bridge the gap between end surfaces 26 and 34. In making this root pass the weld head indicated at numeral 1 in FIG. 4 is placed between end surfaces 26 and 34 and material is added to fill the gap. As the root pass is made any excess material, slag, sparks, flying bits of material and particles carried by gaseous material are prevented from reaching the ball valve cavity by the lip 30. Any particles generated by this welding which move toward the interior of the ball valve are trapped by the pocket, groove 40, formed in lip 30 and thereby prevented from contacting or damaging valve ball 14. As weld bead 1 is placed, some pooling or melting of material in the closed end portion of groove 40 can occur depending upon the physical size of the members involved. This pooling is permissible and does not interfere with or significantly alter the weld joint structure. Referring to FIG. 4, it shows weld joint 20 in the fully welded condition with curved lines indicating the weld beads in the joint. Numerals on the first eight passes in the weld joint indicate the order and location in which the successive weld beads are preferably placed. As shown, the first pass weld bead 1 spans the gap between surfaces 26 and 34. From this point, successive beads are laid from the left to the right in circumferentially placed rings around valve body 12 and tailpiece 16 as shown in FIG. 4. In welding joint 20 above the numbered layers of weld beads, the order of laying the beads is relatively unimportant and no specific order of the welding need be followed. However, it is preferable to follow a general pattern in laying the beads from valve body side of the joint toward tailpiece side of the joint. After the initial welding pass which joins surfaces 26 and 34 in the root of the joint then weld droppings, slag and other material formed in the welding process can be removed from the outer surface of the joint as necessary.

Another embodiment, of this invention shown in FIGS. 5-8 involves using the full penetration weld joint of this invention to secure an end cap or the like to the end of a hollow cylindrical member. This adaptation of the invention is preferably used on a hydraulic cushioning unit shock absorber cylinder 60 to secure an end cap on to the end of the cylinder. Referring to FIG. 5, a hollow cylinder 62 is shown with an end cap 64 mounted on one end thereof joined by the full penetration weld joint 66 of this invention. One portion of weld joint 66 is formed on end cap 64 and the other portion is formed on the end portion of cylinder 62. Weld joint 66 appears from the exterior of the members to be a butt type weld joint having a generally V-shaped groove divergent outward from the root of the weld.

Cylinder 62 is provided with a flat surface 68 on the extreme end thereof which lies in a plane essentially perpendicular to its elongated axis. An inclined surface 70 extends angularly from flat surface 68 toward the opposite end of cylinder 62 forming one side of the generally V-shaped groove. Surface 70 covers the major portion of the cylinder sidewall end. On the outer portion of the cylinder sidewall another inclined surface 70 joins exterior cylinder surface 74.

Cylinder end cap 64 has essentially half of weld joint 66. A lip 76 is provided on the inner portion of end cap 64 to lap over an inside end portion of cylinder 62. End cap 64 has an inclined surface 78 extending outwardly from a end flat surface 80 and inclined toward the opposite end of the end cap. Flat end surface 80 is located at what is the root portion of weld joint 66. Surface 78 covers the major portion of the thickness of the end cap sidewall. An outer inclined surface 82 joins inclined surface 78 on the outer portion of end cap 64 and extends to the outer peripheral surface 84 of end cap 64. Lip 76 has a flat peripheral surface 86 which contacts the inside surface 87 of cylinder 62. An essentially U-shaped groove 88 is formed at the juncture of flat surfaces 80 and 86 as shown clearly in FIGS. 6 and 7. U-shaped groove 88 has its closed end portion 90 in an undercutting relation to inclined surface 78 or substantially underneath inclined surface 78 relative to the exterior of end cap 64. The longest side of U-shaped groove 88 is indicated at 92 and it joins lip surface 86 at a point substantially spaced from flat end surface 80. U-shaped groove 88 has its sides angularly oriented relative to the elongated axis of cylinder 62 as indicated at angle D in FIG. 6. Angle D indicates the inclination of groove side 92 relative to the elongated axis. It is permissible for angle D to vary from about around 20° to about around 55°. It is preferable for angle D to be approximately 30° for this specific application of the weld joint of this invention. Groove 88 can vary in width from between about one sixty-fourth inch, (3.97 mm) and about 1 inch (2.54 cm) or larger, depending upon the thickness and sizes of materials involved. In practice for materials of about one-half inch (1.27 cm) to about 1½ inch (3.81 cm) wall thickness it has been found that a groove of about one-fourth inch (0.635 cm) is desirable. Preferably the groove closed end portion 90 is arcuate or shaped in a cross-sectionally rounded configuration as shown in detail in FIGS. 6 and 7. Groove closed end portion 90 can have a shape other than round, however it must be smoothly contoured to avoid unduly large stress concentrations. Inclined surfaces 70 and 78 are preferably inclined at substantially about the same angle relative to the elongated centrally disposed axis of cylindrical member 62. The elongated axis of cylindrical member 62 for the purposes at hand contains the centroid of the arc of curvature of cylinder end member 64 and cylindrical member 62 at weld joint 66. In FIG. 6, the inclination of surface 78 is shown at angle C. Angle C can vary in the range of from about 30° to about 80°. Preferably angle C is about 60°. Surface 82 is shown inclined relative to the cylinders elongated axis. The inclination of surface 82 is not a particularly critical portion of the weld joint of this invention and can be varied within reasonable suitable limits or eliminated depending upon the wall thicknesses of the specific members involved and the desire of the user.

FIG. 7 shows the joint portion of cushioning unit cylinder 60 in position before welding. In this position lip surface 86 contacts inner cylinder 87 and facing end surfaces 80 and 68 are separated by a gap. This gap can be varied between one-sixteenth inch (1.58 mm) and three-eighths inch (9.54 mm). Preferably the gap is approximately one-eighth inch (3.18 mm). It is to be noted that end surface 68 is substantially spaced from the juncture of lip surface 86 and groove surface 92 so that when the joint is welded then excess weld material etc. will drop into the closed end of portion of U-shaped groove 88.

In the forming of weld joint 66 surfaces 78, 80 and 86 are shaped as end cap 64 is constructed. End surface 80 and lip surface 86 are initially formed so they join at a corner. Once these surfaces have been formed then U-shaped groove 88 is cut by a single operation with an appropriately shaped machine cutting tool. The cut for groove 88 is arranged so it is at the juncture of lip surface 86 and end surface 80 and has a finished shape substantially as shown and described. It is to be noted that U-shaped groove 88 can be formed by a single machine setup operation as compared with prior art grooves or pockets wherein multiple setups and passes with a machine cutting tool with like are required. In regard to the machining of weld joint 66 it is to be noted that the outer end of lip 76 is champhered on the portion adjacent to lip surface 86 to provide for a rounding of the end contour of the lip and to prevent gouging of cylinder surface 89 during assembly of the joint.

FIG. 8 shows weld joint 66 in the welded condition with weld beads between the facing surfaces illustrated by curved lines. The actual welding of joint 66 is preferably done the same as the welding of joint 20, described hereinbefore. For brevity, this discussion will not be duplicated here. Numerals 1a to 8a in the root portion of weld joint 66 correspond to numerals 1-8 of joint 20. In the root portion of the weld, the weld beads are numbered. The numbers 1a to 8a on these weld beads indicate the preferred order of applying the weld beads. The weld beads laid above the third tier of weld beads need not be placed in the order as shown, however it is preferred that welding proceeds in layers of beads placed in layers from the member having lip 76 to the other member. When the space between the opposed surfaces of the joint have been filled out with weld material the outer surface of weld joint 66 is finished as desired by the user.

In the manufacture and use of the weld joint of this invention it is obvious that it provides the easily constructed full penetration weld joint which has an easily formible pocket portion to catch droppings, etc. from the weld in the root of the joint. Because of the angularly oriented novel U-shaped groove which forms the pocket the member having this pocket can be easily manufactured by including a single step in the machining of the operation. Because of the rounded configuration of the pocket or groove, stresses in the area of the weld joint are minimized and stress cracking is thereby avoided.

In the use and operation of the weld joint of this invention, it is seen that same provides an easily constructed pocket portion in machined part for catching weld material dropped through the root portion of the weld as abutting members are joined in the welding process. In manufacture of a member with the pocket or groove it would seem that because of the unique and novel U-shaped groove, it can be easily machined by including only a single additional setup or tool change in the manufacture of a part.

As will become apparent from the foregoing description of the weld joint structure, relatively simple and effective means have been provided to join two members in a full penetration weld joint wherein a pocket is formed on one of the members to receive surplus weld material and other miscellaneous materials generated in the welding process and prevent this material from entering the assembled structure. This novel weld joint structure is economical to manufacture, simple to use, and provides a positive means to catch weld material as the gap between abutting members of a structure is welded.

What is claimed is:

1. A full penetration weld joint for connecting two members, comprising:
   a. first and second members each having opposed edge portions in juxtaposed relation, said first member having a lip portion extending from one side of said edge portion on said first member and lapping over a portion of said second member,
   b. said opposed edge portions having opposed facing end surfaces on inner portions of said opposed edge portions being inclined outwardly in outer portions thereof forming an open groove, with said facing surfaces defining the root of the weld joint, said facing surface on said first member extending outwardly from the plane of the outer surface of said lip,
   c. a generally U-shaped undercut groove in said first member having the closed end thereof substantially underneath said inclined edge portion of said first member having one side thereof terminating underneath said second member and opening at the juncture of said facing surface and said lip portion, and said U-shaped groove being inclined relative to said lip portion at an acute angle and at a location such that said groove can be formed in a single machining operation, and
   d. weld metal filling said open groove joining said facing surfaces and said opposed edge portions and forming a joint between said first member and said second member.

2. The weld joint of claim 1, wherein said U-shaped groove has a substantial arcuate curvature in said closed end portion to reduce stress concentrations in said weld joint and said members.

3. The weld joint of claim 1, wherein:
   a. said members are curved at least in the portion thereof having said edge portions with said edge portions lying along an arc of the curvature,
   b. said gap having a dimension of between around one-sixteenth inch to around three-eighths inch,
   c. said U-shaped groove having the sides thereof at said lip oriented at an angle of between around 20° to around 55° relative to a plane perpendicular to a line through the centroid of arc of curvature of said members, and
   d. said U-shaped groove having a width dimension of from between around one-sixty-fourth inch to around 1 inch.

4. The weld joint of claim 3, wherein said U-shaped groove is oriented at an angle of approximately 30° relative to said portion of said lip contacting said second member, and said gap has a thickness of approximately one-eighth inch.

5. The weld joint of claim 3, wherein said second member being a ball valve body having said edge portion on one end edge portion thereof, said first member being a ball valve tailpiece having said edge portion and said lip on one end edge portion.

6. The weld joint of claim 3, wherein said second member is a cylindrical member having said edge portion on one end edge portion thereof, and said first member is a cylinder end member having said lip on one end edge portion thereof.

7. A full penetration weld joint connecting opposed circumferential end portions of separate members, comprising:
   a. a lip having a substantially cylindrical exterior surface extending from the inner circumferential surface of one end portion of one member and lapping over the interior portion of a circumferential end of the other member,
   b. said opposed circumferential end portions having facing radially disposed end surfaces on inner portions thereof, said facing surfces being spaced from each other a distance of between around one-sixteenth inch and to three-eighths inch to form a gap, said end portions having inclined opposed and divergent surfaces extending outwardly from said facing end surfaces, said facing surface being adjacent said substantially cylindrical lip surface and extending radially outward from a plane defined by said substantially cylindrical lip surface,
   c. a generally U-shaped undercut groove at the juncture of said lip with said adjacent facing end surface, said U-shaped groove having the closed end thereof in a position substantially underneath said inclined surface having one side thereof terminating underneath said other member and with the open portion thereof opening into said gap in a position and at a location selected such that said groove can be formed in a single machining operation, said U-shaped groove being oriented at an angle of between around 20° to around 55° with respect to said substantially cylindrical lip surface, and d. weld metal joining said opposed end portions and filling said gap between said facing and said surfaces and said opposed and divergent surfaces.

8. The weld joint as set forth in claim 7, wherein said opposed circumferential end portions are positioned on a ball valve body and a ball valve tailpiece.

9. The weld joint as set forth in claim 7, wherein said opposed circumferential end portions are positioned on a hollow cylindrical member and a cylinder end member.

* * * * *